US008309915B2

(12) United States Patent
Mackie et al.

(10) Patent No.: US 8,309,915 B2
(45) Date of Patent: Nov. 13, 2012

(54) MASS SPECTROMETER USING AN ACCELERATING TRAVELING WAVE

(75) Inventors: Thomas R. Mackie, Verona, WI (US); Adam A. Hecht, Madison, WI (US); Joseph J. Bisognano, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 851 days.

(21) Appl. No.: 12/419,745

(22) Filed: Apr. 7, 2009

(65) Prior Publication Data

US 2010/0252728 A1 Oct. 7, 2010

(51) Int. Cl.
*B01D 59/44* (2006.01)

(52) U.S. Cl. ........ 250/283; 250/281; 250/282; 250/288; 250/290; 250/291

(58) Field of Classification Search .................. 250/281, 250/282, 283, 286, 288, 290, 291
See application file for complete search history.

(56) References Cited

U.S. PATENT DOCUMENTS 5,439,513 A * 8/1995 Periasamy et al. ................ 96/25
5,811,944 A 9/1998 Sampayan et al.
5,905,259 A 5/1999 Franzen
2006/0036425 A1* 2/2006 Le Cocq et al. ................. 703/22
2006/0060768 A1* 3/2006 Kaufman et al. ............. 250/281
2009/0014641 A1* 1/2009 Bateman et al. .............. 250/282
2010/0032561 A1* 2/2010 Giles et al. .................... 250/283
2010/0038530 A1* 2/2010 Giles et al. .................... 250/283
2010/0327157 A1* 12/2010 Green et al. ................. 250/282

OTHER PUBLICATIONS

Briggs, Richard, J., Pulse Line Ion Acclerator Concept, Physicacal Review Special Topics—Accelerators and Beams 9, pp. 060401-1-060401-17, 2006, The American Physical Society, College Park, Maryland, USA.

Wiedenbeck, Michael, et al., A Mass Filter Based on an Accelerating Traveling Wave, Rapid Communications in Mass Spectrometry, 2008, vol. 22, pp. 623-629, John Wiley & Sons, Ltd., Hoboken, New Jersey, USA.

* cited by examiner

*Primary Examiner* — Michael Logie
(74) *Attorney, Agent, or Firm* — Boyle Fredrickson, S.C.

(57) ABSTRACT

A mass spectrogram employs a set of controllable electrodes to produce a time varying axially inhomogenous electric field and enhance separation of charged particles by exposing the charged particles to different electric field strengths based on their spatial positions. The fields may be tailored to provide a traveling wave that expands portions of a spectrographic plot of the particles and/or to provide focusing or other effects.

18 Claims, 6 Drawing Sheets

MASS SPECTROMETER USING AN ACCELERATING TRAVELING WAVE

STATEMENT REGARDING FEDERALLY SPONSORED RESEARCH

CROSS-REFERENCE TO RELATED APPLICATIONS

BACKGROUND OF THE INVENTION

The present invention relates to mass spectrometry and, in particular, to a spectrometer providing variable and improved sensitivity.

In a typical mass spectrometer, particles, such as different molecular species, are ionized and accelerated in an electric field. The acceleration of particles having the same charge will be principally dependent on the mass of the particles and thus particles may be separated by mass according to their final velocity in the electric field. Differences in velocity may be detected by a time-of-flight detector positioned after a drift region or by passing the particles through a magnetic or electric field to separate them into curving trajectories determined by mass and velocity to be received by a spatial detector.

For a larger mass species, the relative difference in velocities between the particles becomes much smaller. For example, in biological molecules with a mass around 1000 amu with a 0.01 amu difference, the time of flight (TOF) separation, normalized to one of the species can be on the order of:

$$\frac{\Delta TOF}{TOF_0} = 5.0 \times 10^{-6}$$

For a 1 m drift following a 25 kV acceleration potential, the time of flight of the reference species ($TOF_0$) can be on the order of 14 μs. Distinguishing these two species thus requires a time resolution of 72 ps in the time-of-flight detector, a resolution equal to the time for light to travel less than an inch. A similar problem, albeit in the spatial dimension, occurs with a bending magnet/spatial detector system.

SUMMARY OF THE INVENTION

The present inventors have recognized that increased velocity separation between species can be obtained through the use of a spatial- and time-variant electric field for accelerating the species. This more sophisticated accelerating field allows different species to experience different accelerating potentials increasing their separation without the need for greater accelerating voltages, increased drift regions, or increased detector size.

In prior art systems, ions of the same charge in the same field gain the same amount of energy and the TOF variation is just mass dependent, $$\frac{\Delta TOF}{TOF_0} = \frac{\sqrt{m}}{\sqrt{m_0}} - 1.$$

In constrast, in the present invention with a more sophisticated accelerating field in which the ions experience different potentials, different ions gain different amounts of kinetic energy (KE) and the subsequent drift TOF can be expressed $$\frac{\Delta TOF}{TOF_0} = \frac{\sqrt{m}}{\sqrt{m_0}} \frac{\sqrt{KE_0}}{\sqrt{KE}} - 1.$$

If the fields are such that heavier ions gain less kinetic energy, this kinetic energy ratio serves as an "enhancement factor" to the spread in the TOF.

The ability to produce an spatial- and time-varying electric field can be used to flexibly and selectively magnify the axes of the mass spectrogram, allowing the user to "zoom" in on particular peaks while accommodating a wide range of masses. The spatial- and time-varying electric field also permits sophisticated focusing techniques to be used to reduce peak width.

Specifically then, the present invention provides a mass spectrometer having a source presenting multiple species of charged particles along an axis. The particles enter the axially inhomogeneous field chamber having a series of independently controllable electrodes that expose the particles to a spatially- and time-variant electric field as the charged particles move along the axis. A detector system positioned to receive the charged particles from the spatially- and time-variant field chamber detects differences in the speed of the particles passing through the field. An electronic computer executes a stored program: (i) to apply different electric fields to spatially-separated species within the spatially- and time-variant field chamber over a continuous range of electric fields to increase the velocity separation of the spatially-separated species, and (ii) to read the detector system and output mass spectrogram data reflecting the different electric fields.

It is thus one object of the invention to provide a versatile mass spectrogram that may better differentiate between charged particles.

The electronic computer may control the spatially- and time-variant field chamber to produce a traveling wave moving along the axis.

It is thus an object of the invention to use the spatial separation of the particles during acceleration along the axis to differentiate the electric field experienced by the particles.

The traveling wave may move along the axis at a varying rate of speed.

It is thus an object of the invention to allow the force differences produced by the spatially-variant field to track the particles as they move through the chamber.

The electronic computer may determine the energy gained by particles by integrating the value of the spatially-variant and time-variant electric field over the trajectory of the particles along the axis.

It is thus an object of the invention to permit a calibrated spectrogram to be produced with an arbitrary accelerating waveform.

The location of each species in the spatially-variant field chamber may be determined iteratively at a series of locations based upon an average electric field at a previous location.

It is thus an object of the invention to provide a method of managing the complex interaction between the force experienced by a particle in the traveling wave and its acceleration with respect to the traveling wave.

The spectrometer may further include a static field chamber positioned along the axis exposing the particles to a static electric field as they move through the static field chamber or the spatially-variant field chamber itself may apply a static electric field in addition to the spatially-variant time-variant electric field.

It is thus an object of the invention to provide an additional degree of freedom in producing an arbitrary spatially-variant, time-variant accelerating field.

The mass spectrogram data may be output as a graph of species amount versus mass/charge ratio providing two scale portions on the mass/charge ratio axis having different resolutions and the electronic computer may accept user inputs of a mass range to determine the location of the different scale portions.

It is thus an object of the invention to provide for a flexible spectrographic display that may simultaneously provide a high degree of magnification for some mass ranges while still providing a large range of masses necessary to include display of a calibrant or the like.

The axially inhomogeneous field chamber may extend along a line or may extend along a circle.

It is thus an object of the invention to permit an arbitrarily long acceleration region.

The axially inhomogeneous field chamber may include a set of stacked, electrically insulated electrodes each separately controlled by a solid-state amplifier controlled by the electronic computer to vary the speed and shape of the electric field within the axially inhomogeneous field chamber. The solid-state amplifiers may provide continuous control of amplitude of electrical voltage applied to the electrodes.

It is thus an object of the invention to provide an acceleration chamber that may produce an arbitrary waveform shape and amplitude in both position and time.

The electronic computer may further execute the stored program to apply different electric fields to spatially-separated species within the axially inhomogeneous field chamber to decrease separation of spatially separated species.

It is thus an object of the invention to use the arbitrary waveform chamber to provide for focusing of spectrographic peaks.

These particular objects and advantages may apply to only some embodiments falling within the claims, and thus do not define the scope of the invention.

DETAILED DESCRIPTION OF THE PREFERRED EMBODIMENT

Figure 1:
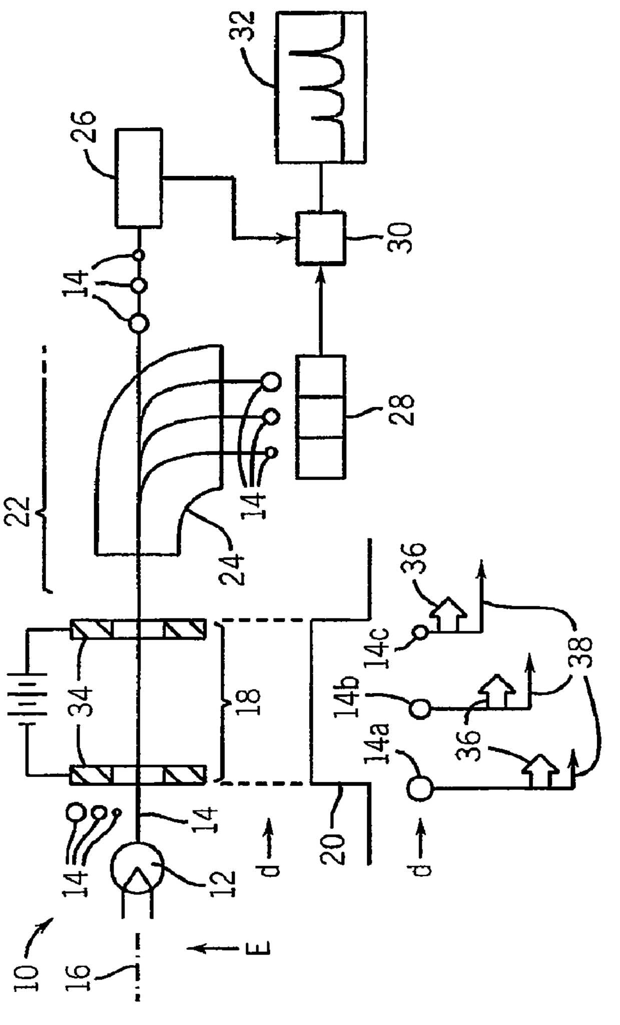
FIG. 1 PRIOR ART
FIG. 1 is a schematic representation of a prior art mass spectrometer having a spatially- and time-variant accelerator chamber and showing two alternative detector configurations.

Referring now to FIG. 1, a conventional mass spectrometer 10 includes an analyte source 12 presenting a stream or pulse of charged particles 14 directed along an axis 16 into an accelerating chamber 18.

The accelerating chamber 18 typically presents a uniform and time invariant electrostatic field 20 (measured along the axis 16) that accelerates the particles 14 into a drift region 22 or a bending field 24. The former drift region 22 allows the particles 14 to separate from their velocity differences before being received by a time-of-flight detector 26 differentiating among particles by their time of arrival.

The latter bending field 24 disperses the particles 14 into a set of curved trajectories determined by the velocity differences of the particles 14 times their mass (i.e., the radius of curvature goes as mass times velocity), thus separating the particles 14 spatially along a spatial detector 28, the latter of which may distinguish among particles 14 by their spatial arrival points. Preferably the field 24 is created by a magnet providing separating radii proportional to the mass times the velocity of the particles 14.

Detectors 26 or 28 may connect with a computer 30 analyzing the data from the detectors 26 or 28 to produce a spectrogram 32 typically being a plot of particle number versus species, the latter differentiated by mass (or technically mass/charge also designated m/z).

Referring still to FIG. 1, within the accelerating chamber 18, the electric field is generally static (time invariant) and uniform between plates 34 of the chamber 18 along axis 16. Consequently each of the like charged particles 14*a*, 14*b*, and 14*c* (having successively decreasing masses in this example) experience identical electric forces 36. Because of the mass differences of charged particles 14*a*, 14*b*, and 14*c*, however, the charged particles 14*a*, 14*b*, and 14*c* experience different accelerations to different velocities 38. These different velocities 38 ultimately produce the velocity differences in the drift region 22 or in the bending field 24 used separate the particles 14.

Figure 2:
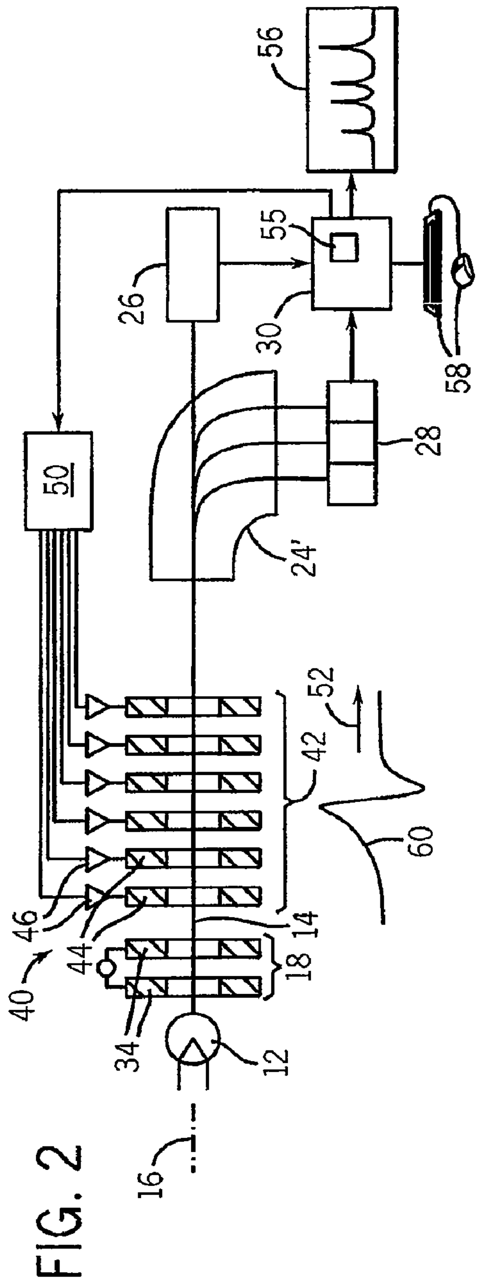
FIG. 2 is a figure similar to that of FIG. 1 showing a mass spectrometer according to one embodiment of the present invention providing a spatially- and time-variant field chamber controlled by an electronic computer.

Referring now to FIG. 2, a spectrometer 40 of the present invention also provides for an analyte source 12 presenting charged particles 14 along axis 16. In this case, the charged particles 14 are received by an arbitrary field chamber 42 which produces a controllable, time-variant, spatially-variant field along the axis 16.

The anisotropic field chamber 42 may, for example, be composed of a set of parallel rings 44 spaced along and coaxial with axis 16. Each of the rings 44 is electrically isolated from the others and connected to an output of a separate amplifier 46 allowing independent control of the voltage of the rings 44 throughout a range of voltages. Each amplifier 46 receives a waveform from a waveform generator 50 which may simultaneously generate a different independent waveform for each ring 44. The waveform generator 50 may independently control the voltages on each of the rings 44 to create, in one embodiment, a traveling wave 60 that moves at a controlled acceleration 52 along the axis 16 through the arbitrary chamber 42. The ability to provide a different control waveform of arbitrary shape to each ring 44 allows the generation of a wide variety of arbitrary time-variant electric fields for a variety of purposes as will be described.

An optional static field chamber 18 providing an initial uniform acceleration of the particles 14 may be positioned before the chamber 42 and aligned with axis 16. Alternatively, the voltages on the rings 44 may be controlled to provide a similar static field.

Referring still to FIG. 2, an electronic computer 30 executing a stored program 55 may communicate with the waveform generator 50 to determine the shape and speed of the traveling wave 60 which may be synchronized with signals received from detector 26 or 28 and modified according to user input. The user input may be received by the computer 30 through a keyboard or cursor control device 58 according to methods well known in the art. The signals from the detectors 26 or 28 may be processed by the computer 30 to produce a spectrogram 56 representing the actual time or position separation magnification experienced by the particles as will be described.

As shown in FIG. 2, the field 24' may be, in this case, optionally provided by an electric dipole which provides separating radii proportional to kinetic energy of the particles providing improved peak separation in the context of the present invention where differences in particle momentums are not as pronounced.

Figure 3:
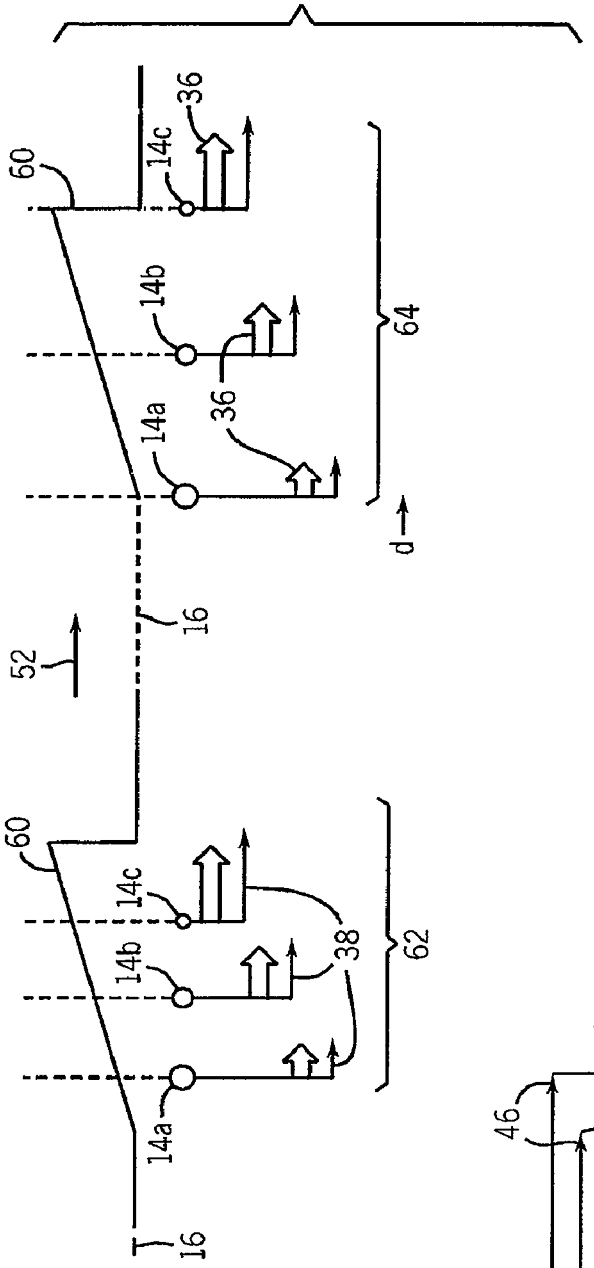
FIG. 3 is a schematic representation of the forces experienced by different charged species at a first and second time within the axially inhomogeneous field chamber of FIG. 2.

Referring now to FIG. 3, in a simple embodiment, the electronic computer 30 may be programmed to drive the waveform generator 50 to provide a ramp-shaped traveling wave 60 having constant width along axis 16 and accelerating away from the analyte source 12 to track and embrace particles 14*a*-14*c* representing different species of particles with the identical charge. In this example, the center of the traveling wave 60 is aligned with particle 14*b*. In an initial region 62 of the anisotropic field chamber 42, the particles 14*a*-14*c* will have separated slightly based on their different masses under the influence of the electric field provided by the traveling wave 60 or earlier static wave chamber 18. As the particles 14*a*-14*c* separate, the slower, heavier particles 14*a* move backward with respect to the center of the traveling wave 60 to experience a lower electric force 36 as a result of the ramp shape of the traveling wave 60. In contrast the faster particles 14*c* move forward with respect to the traveling wave 60 to experience a higher electric force 36 based on the upward ramping of the traveling wave 60. In this respect, the forces 36 experienced by the different particles 14*a*-14*c* differ, with the leading and faster particles 14*c* receiving additional accelerative force 36 to accelerate faster than the trailing and slower particles 14*a*, both increasing the difference in velocities 38 experienced by the particles 14*a*-14*c* and imparting different amounts of energy to the particles based on the different fields.

Referring still to FIG. 3, at a later time when the particles 14*a*-14*c* are in a later region 64, additional separation of the particles 14*a*-14*c* caused by their differences in velocity further decreases of the electric force 36 on particle 14*a* and further increases the electric force 36 on particles 14*c*. Thus, the traveling wave 60 produces two effects which increase the velocity separation of the particles 14*a*-14*c*: (i) the difference in electric fields experienced by the spatially separated particles at any time, and (ii) the change in the electric fields experienced by the spatially separated particles over time.

If the traveling wave 60 is properly shaped to provide a substantially linear function with distance and is accelerated to match the center of mass of the particles 14*a*-14*c* and expanded in axial width as the particles 14*a*-14*c* disperse, a simple expansion in the horizontal axis (m/z) of the spectrogram 56 by a constant amount is produced providing essentially a zoom feature based on actual physical changes allowing particular portions of the spectrogram 56 to be arbitrarily enlarged.

Figure 4:
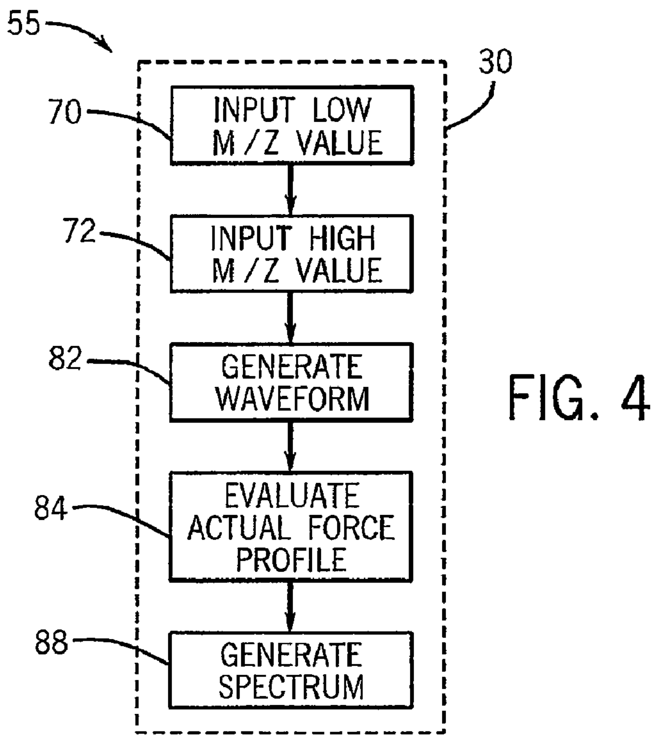
FIG. 4 is a flow chart showing steps executed by the electronic computer of FIG. 2 in implementing the present invention.
Figure 5:
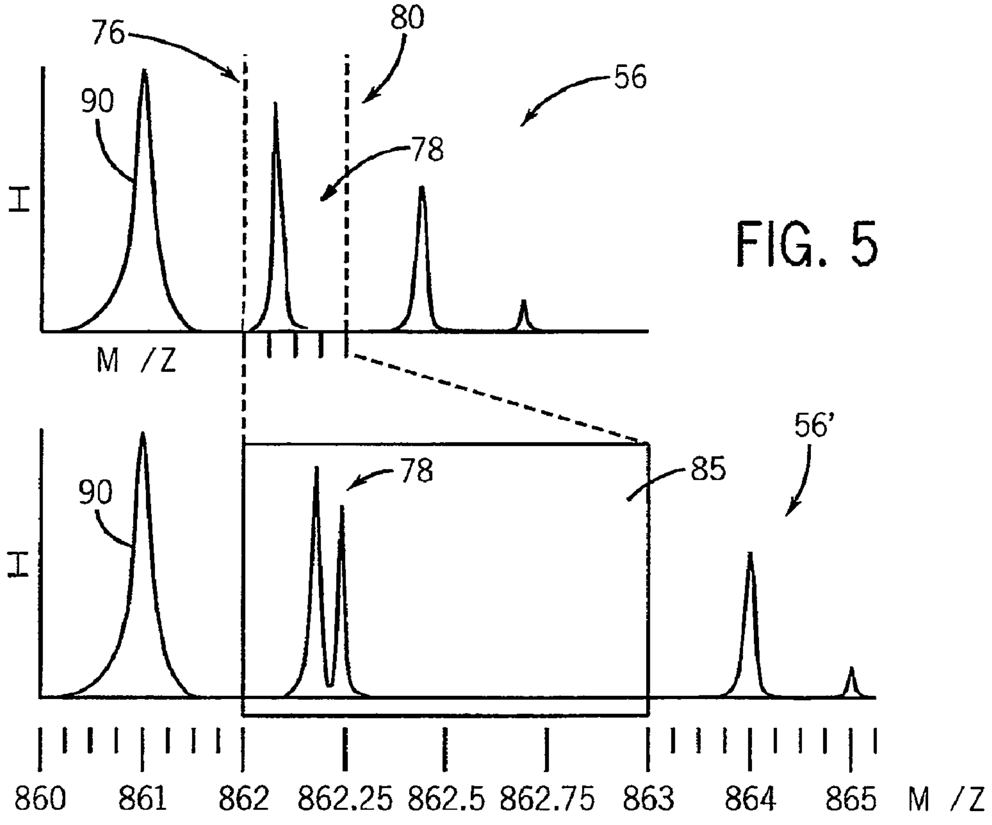
FIG. 5 is a first and second representation of a mass spectrogram showing a zooming feature enabled by the present invention.

Referring now to the FIGS. 4 and 5, the electronic computer 30 may implement this zoom feature executing the stored program 55 to receive a first input designating a lower m/z boundary for the expanded portion of the spectrogram 56 and a second input designating an upper m/z boundary for the expanded portion of the spectrogram 56 as indicated by process blocks 70 and 72 respectively. As shown in FIG. 5, a normal spectrogram 56 using an isotropic static acceleration field may be displayed and the low m/z value input and high m/z value input entered by positioning a first cursor 76 at the lower m/z value and second cursor 80 at the upper m/z value, for example, about a peak 78 designating a range for expansion.

At process block 82, based on these inputs 76 and 80, the computer 30 may generate a traveling wave 60, for example, as shown in FIG. 3, to expand the species between the cursors 76 and 80 by aligning the traveling wave 60 with those species as they move through the arbitrary chamber 42. The effect of the arbitrary traveling wave 60 is to expand or magnify the region between the cursors 76 and 80 to an expanded portion highlighted by region 85. The amount of expansion may be controlled by the user within the ranges of the spectrometer 40 by controlling the amplitude and length of the traveling wave.

The actual amount of the expansion is computed at process blocks 84 accommodating possible variations in the physically obtainable traveling wave 60. A new spectrogram 56' is then produced, as indicated by process block 88, applying the enhancement factor produced by the traveling wave 60 to expand the m/z axis of the spectrogram 56 appropriately.

Generally, for a simple traveling wave 60 as in FIG. 2, the expanded region 85 will extend rightward to the end of the spectrogram 56 to prevent overlap of different species caused by the discontinuous accelerating fields. Nevertheless, provided that the range of the detector 26 or 28 is not exceeded, the region to the right of the cursor 80, while expanded by the traveling wave 60, may be re-scaled at process block 84 to visually eliminate the expansion and thus to produce the limited expansion of region 85 rather than a full expansion of all spectrographic data to the right of cursor 76'. Note in either case, a low m/z calibrant peak 90 may remain unexpanded to provide for a robust reference value and context for the spectrogram reading.

Figure 6A:
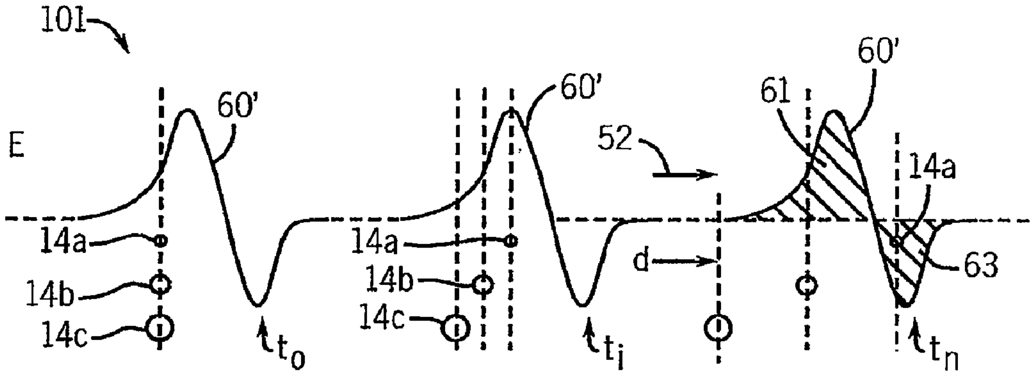
FIGS. 6*a*-6*c* are a set of graphs with aligned distance axes showing the iterative determination of an enhancement factor using complex field shapes.
Figure 6B:
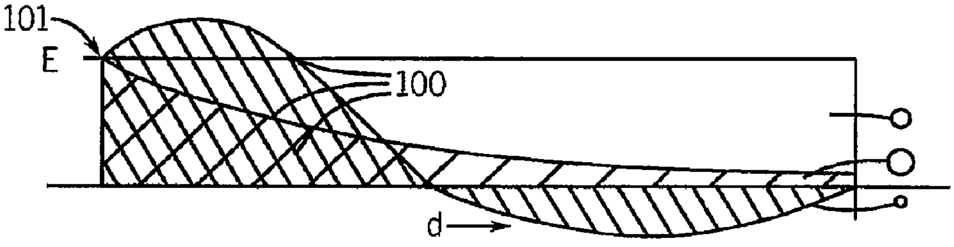
Figure 6C:
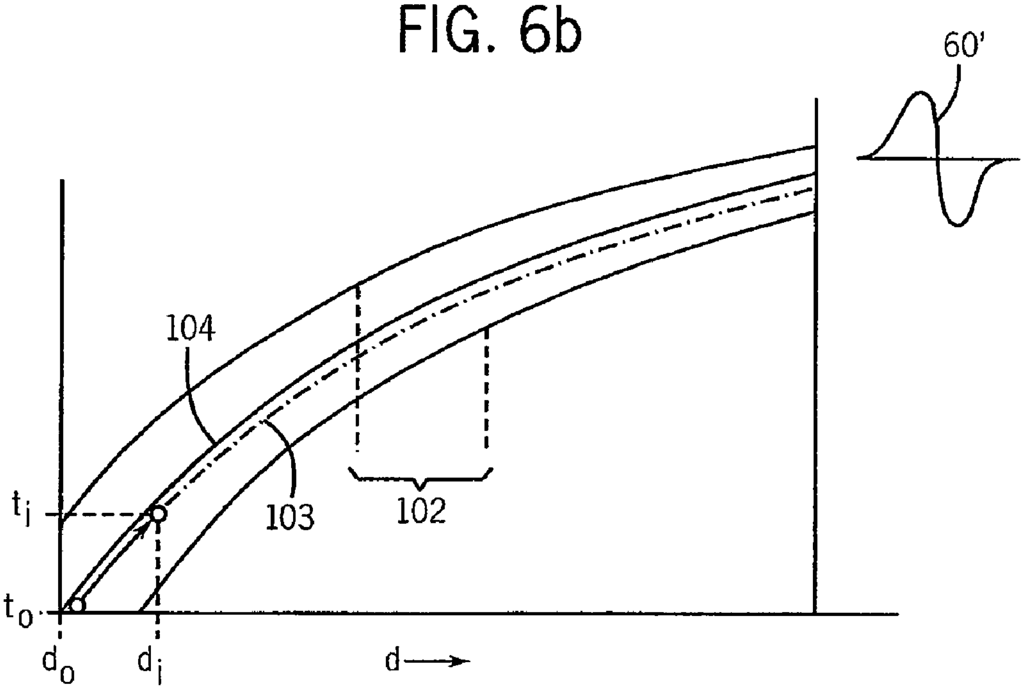

Referring now to FIG. 6*a*-6*c*, generally the traveling wave 60' will be more complicated than the single-polarity ramp depicted in FIG. 3, accommodating practical restraints on waveform generation. Nevertheless, a complicated traveling wave 60' may still provide for the expansion features of the present invention by modeling particle movement through the chamber 42 to deduce its total accelerating field. This different total accelerating field for different species provides an enhancement factor between separate species.

Figure 7:
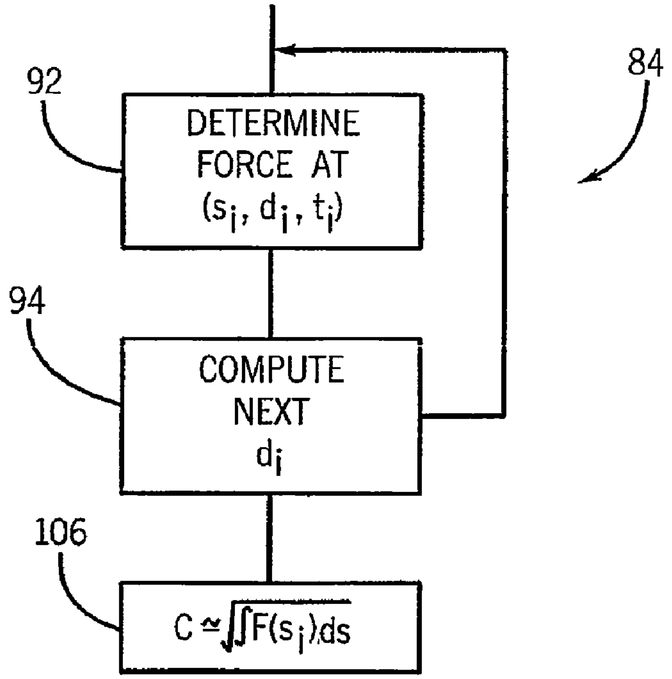
FIG. 7 is a detailed flowchart evaluation of the field profile per FIGS. 6*a*-6*c* and FIG. 4.

Referring now to FIGS. 6 and 7, the process of computing the total accelerating field may begin as indicated by process block 92 with the determination of the force experienced by each species at each location, starting with the entrance of the axially inhomogeneous field chamber 42. At an initial time to, the particles 14*a*-14*c* will have well-defined initial positions 101 with respect to the traveling wave 60' so that a first data point on field profile 100 (shown in FIG. 6*b*) associated with each particle 14*a*-14*c* may be determined per process block 92. The force at this initial position 101 may be used to calculate an incremental movement 104 (shown in FIG. 6c) of each particle 14 to a later time to provide a new location of the particle 14 designated ($d_i$, $t_i$) as indicated by process block 94 and local field experienced (si) as indicated by process block 94. This location may be compared against the waveform trajectory 102 (shown in FIG. 6c) to compute a new instantaneous force acting on the particle in an iterative loop back to process block 92. Again, this new instantaneous force may be used to deduce the next position of the particle with respect to the waveform trajectory 102. This iterative process accommodates the fact that the position of the particles 14a-14c at each point $d_i$ will depend on their history of positions with respect to the traveling wave 60 at all previous points.

The known endpoint of the trajectory 103 of a calibrant at the detector may be used to correct errors accumulating in the iteration by tipping the trajectory 103 to fit between the known initial position 101 and the final detector position.

This iterative process may be repeated for each time $t_i$ to generate a particle trajectory 103 passing through the waveform trajectory 102 and generating a stream of field data providing field profiles 100 for each of particles 14a-14c. The area under these field profiles 100 may be used to determine the average force acting on the particle and thus to provide calibration of the data from detector 26 or 28. Generally, since the energy gained by the particle is proportional to the integral of the field profile, the calibration factor or enhancement factor C will be proportional to the square root of the integral of the field profile 100 per process block 106.

This same methodology may be used to produce a desired shape of traveling wave 60 and to define its trajectory 102, for example by inverse planning techniques known in the art.

Referring to FIG. 6a, it will be understood that that the traveling wave 60' may have two portions with different polarities 61 and 63, where polarity 61 accelerates the particles 14 and polarity 63 decelerates the particles 14. At certain times $t_n$ particles 14 may be allowed to pass up from the positive polarity 61 where they are accelerated to the negative polarity 63 where they are decelerated with respect to the lab reference frame. This deceleration may be used to compress portions of the spectrogram 56, for example to the right of region 85 as shown in FIG. 5. Also the particles experiencing accelerating fields may not keep pace with the accelerating wave form, decelerating with respect to the wave reference frame, which also affects the compression.

Figure 8A:
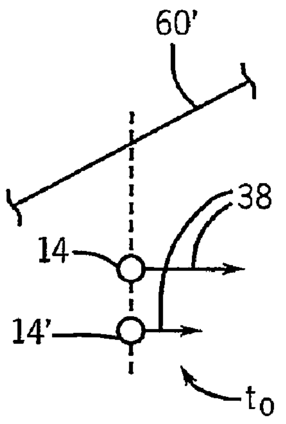
FIGS. 8*a-e* are a graphical representation of a refocusing function implement using the arbitrary waveform chamber.
Figure 8B:
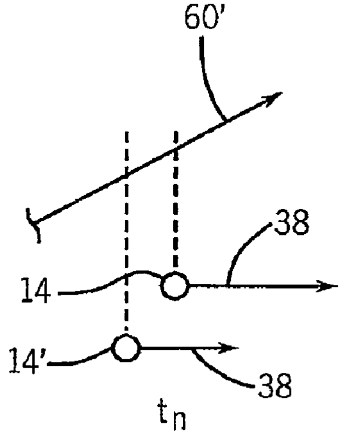

Referring now to FIG. 8a-d, a complex traveling wave 60' may be used to effect a re-focusing of particles 14 and 14' of the same species having slightly different initial velocities. As shown in FIG. 8a, these initial velocities may, for example, differ because of the ejection speed from the analyte source 12 at time to. At a later time $t_n$ (shown in FIG. 8b) this initial velocity difference will cause a separation of the particles 14 and 14', a separation accentuated by the traveling wave 60' and resulting in a spread of the peak associated with particles 14 and 14'.

Figure 8C:
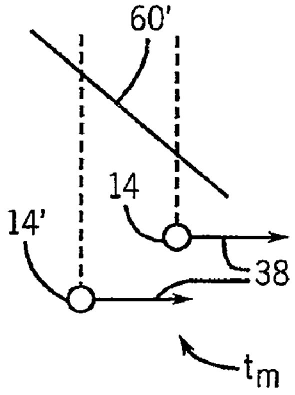
Figure 8D:
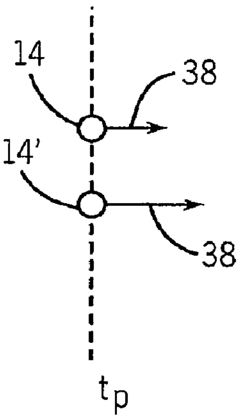
Figure 8E:
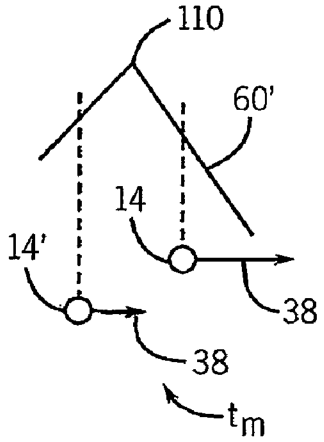

As shown in FIG. 8c, in the present invention, at time $t_m$ the traveling wave 60' may be positioned so that it slopes down in the direction of travel providing relatively greater force on particles 14' having lesser initial velocity and lesser force on particles 14 having greater initial velocity. This force difference may be adjusted so that particles 14 and 14' align at subsequent time $t_p$ (shown in FIG. 8d) aligned with the detector 26 or 28 thus refocusing the peak by eliminating this initial velocity spread. This re-focusing by improving signal strength and thus signal-to-noise ratio, may improve resolution of the spectrogram 56. Alternatively, as shown in FIG. 8e, at time $t_m$, the traveling wave 60 may be positioned so that a crest 110 of the traveling wave 60 is between particles 14 having the greater initial velocity and particles 14' having lesser initial velocity to provide the former particles 14 with less accelerating force relative to particles 14'. This approach provides a refocusing of particles near 14 with the slow ion cut-off of particles near 14'

In the present invention, the technique of reflectometry bunching can be achieved within the device by providing a repelling field in front of the ions we seek to bunch. This field may be timed to affect only a range of ion species. In reflectometry, faster ions of the same mass take longer to reflect back from a repelling field than slower ions, and so travel a longer path which gives the slower ions, more quickly reflected, a head start in the reflected path. The faster ions overtake the slower ions at some point in the reflected path. Reflectometry focuses the ions in time, reducing the individual species spread for TOF measurements.

Figure 9:
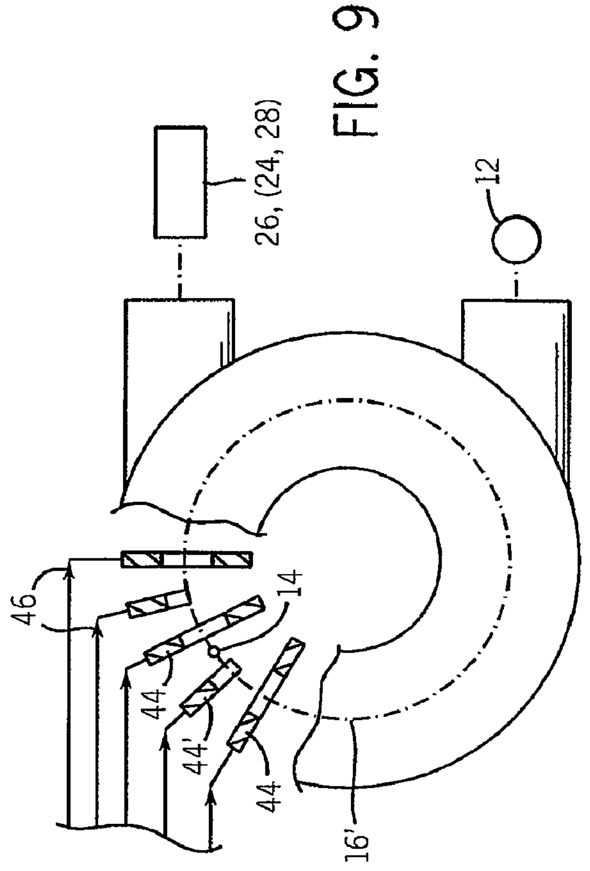
FIG. 9 is a plan view in partial cutaway of the present invention in an embodiment providing a circular axially inhomogeneous field chamber.

Referring now to FIG. 9, the ability to produce a traveling wave allows the generation of a cyclic axially inhomogeneous field chamber in which a traveling wave 60 circulates indefinitely. The acceleration of particles 14 along a circular axis 16' is enforced by a radially increasing gradient traveling wave provided as indicated by partial rings 44' together with full rings 44 to accelerate and curve particles 14 about axis 16. The radial containment may also be via magnetic field, with the angular acceleration via traveling wave. As the radius of curvature in a magnetic field follows the particle momentum mv, using the technique in which heavier masses gain less velocity, the fields may be set such that several mass species may be contained in the same orbital radius. After an appropriate period of acceleration, the particles may be released tangentially to a detector 26 or 28. This system may be used for sorting and separation of particles with similar masses.

Figure 10:
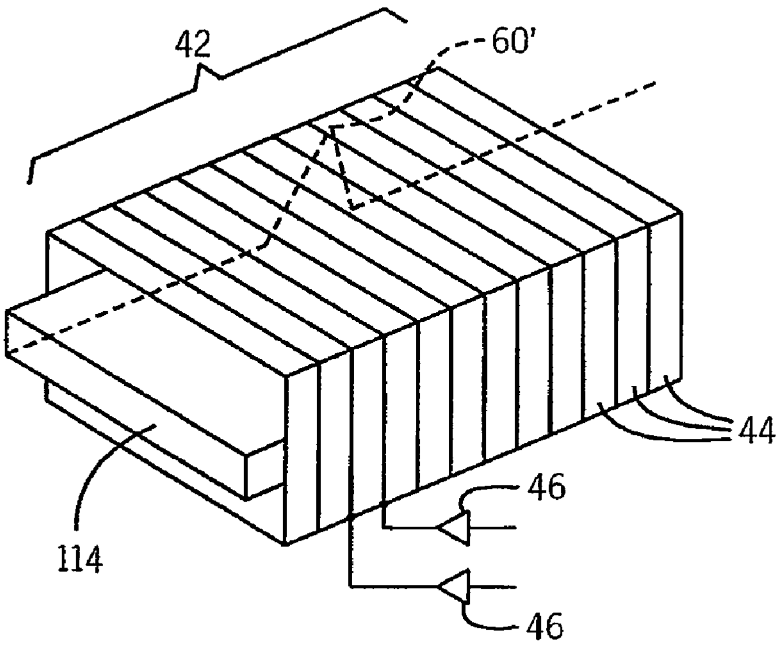
FIG. 10 is a schematic representation of the axially inhomogeneous field chamber applied to electrophoresis machine.

Referring now to FIG. 10, the present invention may provide application to other types of particle separation in which a block 114 of electrophoretic gel, filter medium, or a gas column may be placed in the arbitrary chamber 42 to be exposed to traveling waves 60 for separation of particles.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A mass spectrometer comprising:

a source presenting multiple species of charged particles along an axis;

an axially inhomogeneous field chamber positioned to receive the charged particles along the axis and providing a series of independently controllable electrodes to expose the particles to an arbitrary and time-variant electric field as the charged particles move along the axis;

a detector system positioned to receive the charged particles from the axially inhomogeneous field chamber to detect differences in arrival time or spatial separation of the particles after passing through the axially inhomogeneous field chamber; and an electronic computer executing a stored program to:

(i) apply different electric fields to a first subset of spatially-separated species defining a substantially continuous range of adjacent charged particles within the axially inhomogeneous field chamber over a continuous range of electric fields to increase a velocity difference of the first subset of spatially-separated species without comparably increasing a velocity difference of a second subset of spatially-separated species within the axially inhomogeneous field chamber, and (ii) read the detector system and output mass spectrogram data reflecting the different electric fields.

2. The mass spectrometer of claim 1 wherein the electronic computer controls the axially inhomogeneous field chamber to produce a traveling wave moving along the axis.

3. The mass spectrometer of claim 2 wherein the electronic computer controls the axially inhomogeneous field chamber to produce a traveling wave moving along the axis at a varying rate of speed.

4. The mass spectrometer of claim 2 wherein the electronic computer determines the total electric force by integrating values of the traveling wave over a trajectory of the particles along the axis.

5. The mass spectrometer of claim 4 wherein a location of each species with respect to the values of the traveling wave is determined iteratively at a series of locations based upon an electric field at a previous location.

6. The mass spectrometer of claim 1 further including a static field chamber positioned along the axis exposing the particles to a static electric field as they move through the static field chamber.

7. The mass spectrometer of claim 1 wherein the axially inhomogeneous field chamber also applies a static electric field to the charged particles as they move through the axially inhomogeneous field chamber.

8. The mass spectrometer of claim 1 wherein the mass spectrogram data are presented in a graph of species amount versus mass/charge ratio.

9. The mass spectrometer of claim 8 wherein the graph provides two scale portions on a mass/charge ratio axis having different resolutions.

10. The mass spectrometer of claim 9 wherein the electronic computer accepts user inputs of a mass range to determine a location of the different scale portions.

11. The mass spectrometer of claim 1 wherein the detector is selected from the group consisting of a time-of-flight detector, a magnetic, and an electric deflection detector.

12. The mass spectrometer of claim 1 wherein the axially inhomogeneous field chamber extends along a line along the axis.

13. The mass spectrometer of claim 1 wherein the axially inhomogeneous field chamber extends along a circle.

14. The mass spectrometer of claim 1 wherein the axially inhomogeneous field chamber comprises a set of stacked electrically insulated electrodes each separately controlled by a solid-state amplifier controlled by the electronic computer to vary the speed and shape of the electric field within the axially inhomogeneous field chamber.

15. The mass spectrometer of claim 14 wherein the solid-state amplifiers provide continuous control of amplitude of electrical voltage applied to the electrodes.

16. The mass spectrometer of claim 1 wherein the electronic computer further executes the stored program to apply different electric fields to spatially-separated species within the axially inhomogeneous field chamber to decrease separation of spatially separated species.

17. The mass spectrometer of claim 1 wherein the electronic computer executes the stored program to further:

accept input from a user defining a mass range;

apply the different electric fields to control the axially inhomogeneous field chamber to modify an acceleration of species within the user-defined mass range; and read the detector system to output a mass spectrogram as a graph of species amount versus mass/charge ratio, with a mass/charge scale of the graph enlarged for the mass range defined by the user.

18. A method of separating charged particles using a mass spectrometer comprising:

a source presenting multiple species of charged particles along an axis;

an axially inhomogeneous field chamber positioned to receive the charged particles along the axis and providing a series of independently controllable electrodes to expose the particles to an arbitrary and time-variant electric field as the charged particles move along the axis;

a detector system positioned to receive the charged particles from the axially inhomogeneous field chamber to detect differences in arrival time or spatial separation of the particles after passing through the axially inhomogeneous field chamber; and an electronic computer executing a stored program to:

apply different electric fields to a first subset of spatially-separated species defining a substantially continuous range of adjacent charged particles within the axially inhomogeneous field chamber over a continuous range of electric fields to increase a velocity difference of the first subset of spatially-separated species without comparably increasing a velocity difference of a second subset of spatially-separated species within the axially inhomogeneous field chamber, and read the detector system and output mass spectrogram data reflecting the different electric fields; the method comprising the steps of:

(a) presenting multiple species of charged particles along an axis;

(b) applying to the charged particles an accelerating traveling electrical wave moving along the axis to apply different electric fields to different species within the traveling wave chamber over a continuous range of electric fields to increase a velocity separation of the different species;

(c) detecting differences in speed of the particles subject to the traveling electrical wave; and (d) outputting mass spectrogram data reflecting the different electric fields.

* * * * *